(12) United States Patent
Henion et al.

(10) Patent No.: US 9,308,867 B2
(45) Date of Patent: Apr. 12, 2016

(54) SIDE REAR VIEW MIRROR ASSEMBLY INDICATOR OF BLIND SPOT OCCUPANCY

(75) Inventors: Paul R. Henion, Port Huron, MI (US); Gary J. Sinelli, Birmingham, MI (US)

(73) Assignee: SMR Patents S.à.r.l., Luxembourg (LU)

( * ) Notice: Subject to any disclaimer, the term of this patent is extended or adjusted under 35 U.S.C. 154(b) by 1493 days.

(21) Appl. No.: 12/764,588

(22) Filed: Apr. 21, 2010

(65) Prior Publication Data

US 2011/0260845 A1 Oct. 27, 2011

(51) Int. Cl.
| | |
|---|---|
| *B60Q 1/00* | (2006.01) |
| *B60R 1/08* | (2006.01) |
| *B60R 1/12* | (2006.01) |
| *G08B 21/00* | (2006.01) |
| *G08G 1/00* | (2006.01) |
| *G02B 5/08* | (2006.01) |

(52) U.S. Cl.
CPC ............. *B60R 1/08* (2013.01); *B60R 1/1207* (2013.01); *B60R 2001/1223* (2013.01); *B60R 2001/1284* (2013.01)

(58) Field of Classification Search
USPC ........... 340/435, 901, 904, 438; 359/843, 604
See application file for complete search history.

(56) References Cited

U.S. PATENT DOCUMENTS

| | | | | |
|---|---|---|---|---|
| 6,363,326 | B1 * | 3/2002 | Scully ..................... | G01S 13/48 340/435 |
| 7,492,281 | B2 | 2/2009 | Lynam et al. | |
| 2006/0056003 | A1 | 3/2006 | Tonar et al. | |
| 2006/0056086 | A1 * | 3/2006 | Hannah ................ | B60Q 1/2665 359/843 |
| 2007/0058257 | A1 * | 3/2007 | Lynam ................ | B60Q 1/2665 359/604 |
| 2007/1158257 | | 3/2007 | Lynam | |
| 2008/0316054 | A1 * | 12/2008 | Lynam ................ | B60Q 1/2665 340/904 |
| 2009/0115631 | A1 * | 5/2009 | Foote ................... | B60Q 1/2665 340/901 |
| 2010/0026475 | A1 * | 2/2010 | Hwang ............... | B60Q 1/2665 340/438 |

FOREIGN PATENT DOCUMENTS

| | | |
|---|---|---|
| CN | 2775680 | 4/2006 |
| CN | 200939857 | 8/2007 |

(Continued)

OTHER PUBLICATIONS

Extended EU Search Report for application No. 11158186.4 dated Jun. 5, 2012.

*Primary Examiner* — Jack K Wang
(74) *Attorney, Agent, or Firm* — Simonelli IP, PLLC

(57) ABSTRACT

A side rear view mirror assembly is used in conjunction with a motor vehicle equipped with a blind spot sensor designed to detect objects in blind spots of the motor vehicle. The side rear view mirror assembly includes a base fixedly secured to the motor vehicle. A mirror case is movably secured to the base. The mirror case defines a housing and a mirror opening facing rearward. A backing light is operatively connected to the mirror case facing rearward. The backing plate is movable with respect to the mirror case. A mirror glass is fixedly secured to the backing plate and movable therewith in a manner allowing an operator of the motor vehicle to view rearward of the motor vehicle. The side rear view mirror assembly also includes a blind spot indicator fixedly secured to the backing plate and in communication with the blind spot sensor to receive signals from the blind spot sensor and to indicate to the operator of the motor vehicle when an object is in a blind spot of the motor vehicle. The blind spot indicator is directed at the operator when the operator moves the backing plate to adjust the mirror glass.

9 Claims, 5 Drawing Sheets

(56) References Cited

FOREIGN PATENT DOCUMENTS

| | | |
|---|---|---|
| CN | 201009817 | 1/2008 |
| DE | 10054315 | 11/2000 |
| EP | 0443185 | 2/1995 |
| EP | 1652727 A1 | 5/2006 |
| FR | 2551005 | 3/1985 |
| GB | 2275329 | 8/1994 |
| GB | 2275329 A | 8/1994 |
| JP | 08268188 | 10/1996 |
| WO | 2007005942 | 1/2007 |

* cited by examiner

SIDE REAR VIEW MIRROR ASSEMBLY INDICATOR OF BLIND SPOT OCCUPANCY

BACKGROUND ART

1. Field of the Invention

The invention relates to a side rear view mirror assembly for a motor vehicle. More particularly, the invention relates to a side rear view mirror assembly having an indicator for identifying when an object is occupying the blind spot of the motor vehicle.

2. Description of the Related Art

The driver of a motor vehicle must recognize that objects such as other motor vehicles move with respect to the motor vehicle being driven by the driver. As such, the driver must constantly review his or her surroundings to determine whether a desired path of travel is not obstructed or, if taken, would cause a collision. Tools that assist a driver in reviewing the space surrounding the motor vehicle include the rear view mirror and the side rear view mirrors. These minors allow the driver to review the surroundings generally disposed behind the driver without the driver having to turn his or her head more than a minimal amount. Locations commonly referred to as "blind spots" exist on either side of the motor vehicle. These blind spots are spaces that are not visible to the driver when the driver is looking in the mirrors and viewing of these blind spots requires the driver to turn his or her head to look to see if another motor vehicle of some other object has entered the blind spots. To overcome this problem, blind spot indicators have sensors that identify when objects enter blind spots. These sensors notify the driver that a blind spot is now being occupied. Indicators in the art include light generators and sound generators. Placement of these generators is critical as it is in the best interests of the driver to have these located within the driver's peripheral vision and in an area where the driver frequently looks.

SUMMARY OF THE INVENTION

A side rear view mirror assembly is used in conjunction with a motor vehicle equipped with a blind spot sensor designed to detect objects in blind spots of the motor vehicle. The side rear view minor assembly includes a base fixedly secured to the motor vehicle. A mirror case is movably secured to the base. The mirror case defines a housing and a mirror opening facing rearward. A backing plate is operatively connected to the mirror case facing rearward. The backing plate is movable with respect to the mirror case. A mirror glass is fixedly secured to the backing plate and movable therewith in a manner allowing an operator of the motor vehicle to view rearward of the motor vehicle. The side rear view mirror assembly also includes a blind spot indicator fixedly secured to the backing plate and in communication with the blind spot sensor to receive signals from the blind spot sensor and to indicate to the operator of the motor vehicle when an object is in a blind spot of the motor vehicle. The blind spot indicator is directed at the operator when the operator moves the backing plate to adjust the mirror glass.

BRIEF DESCRIPTION OF THE DRAWINGS

Advantages of the invention will be readily appreciated as the same becomes better understood by reference to the following detailed description when considered in connection with the accompanying drawings, wherein.

DETAILED DESCRIPTION OF THE PREFERRED EMBODIMENT

Figure 1:
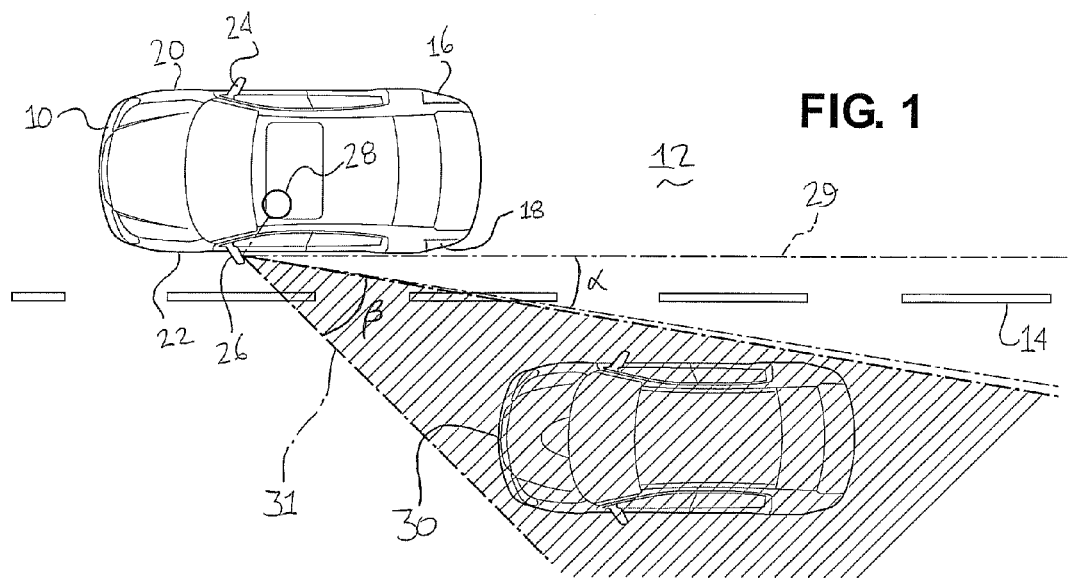
FIG. 1 is a top view of a motor vehicle with a second motor vehicle located in a blind spot of the first motor vehicle.

Referring to FIG. 1, a motor vehicle 10 is shown driving along a road 12 that has a dashed line 14 indicating a boundary of a lane of the road 12. The motor vehicle 10 is equipped with blind spot sensors 16, 18 disposed along each side 20, 22 of the motor vehicle 10. The motor vehicle 10 is also equipped with two side rear view mirror assemblies 24, 26 that extend out from each of these sides 20, 22 respectively. The side rear view mirror assemblies 24, 26 are used by an operator, graphically represented by a circle 28 in FIG. 1, to identify things that are going on outside the motor vehicle 10 rearwardly thereof. The operator 28 will adjust the side rear view mirror assemblies 24, 26 in a manner which allows the operator 28 to be satisfied that as much of the space rearward that can be viewed is being viewed by the operator 28. While most, if not all, motor vehicles 10 are equipped with two side rear view mirror assemblies 24, 26, the remainder of the discussion will focus on the side rear view mirror assembly 26 that is on the driver side 22 of the motor vehicle 10. It will be appreciated by those skilled in the art that the following discussion with regard to the driver side rear view mirror assembly 26 applies equally to the passenger side rear view mirror assembly 24.

When an operator 28 uses a side rear view mirror assembly 26, it is typically adjusted such that the orientation of the mirror includes a portion of the driver side 22 of the motor vehicle therein. The operator 28 does this for purposes of orientation. As is shown in FIG. 1, the field of view for the side view mirror generally includes an angle $\alpha$. Disposed adjacent the field of view 29 that is visible to the operator 28 is what is commonly referred to as a blind spot 31 that extends generally through an angle $\beta$. The operator 28 cannot see what is in the blind spot 31, crosshatched in FIG. 1 without turning the head of the operator 28 in that direction. Said another way, the operator 28 cannot see anything that is in the blind spot 31 through angle $\beta$ by looking in the side rear view mirror assembly 26. It is the blind spot sensor 18 that determines whether an object 30, a motor vehicle shown in FIG. 1, is in the blind spot. If so, the blind spot sensor 18 will transmit over the vehicle communication system an appropriate signal to eventually indicate to the operator 28 that an object does in fact exist in the blind spot 31. It will be the operator's decision as to whether the operator 28 will turn his or her head to view the object 30 or to operate as if the object 30 continues to be in the blind spot 31 and act accordingly with regard to the operation and direction of travel of the motor vehicle 10.

Figure 2:
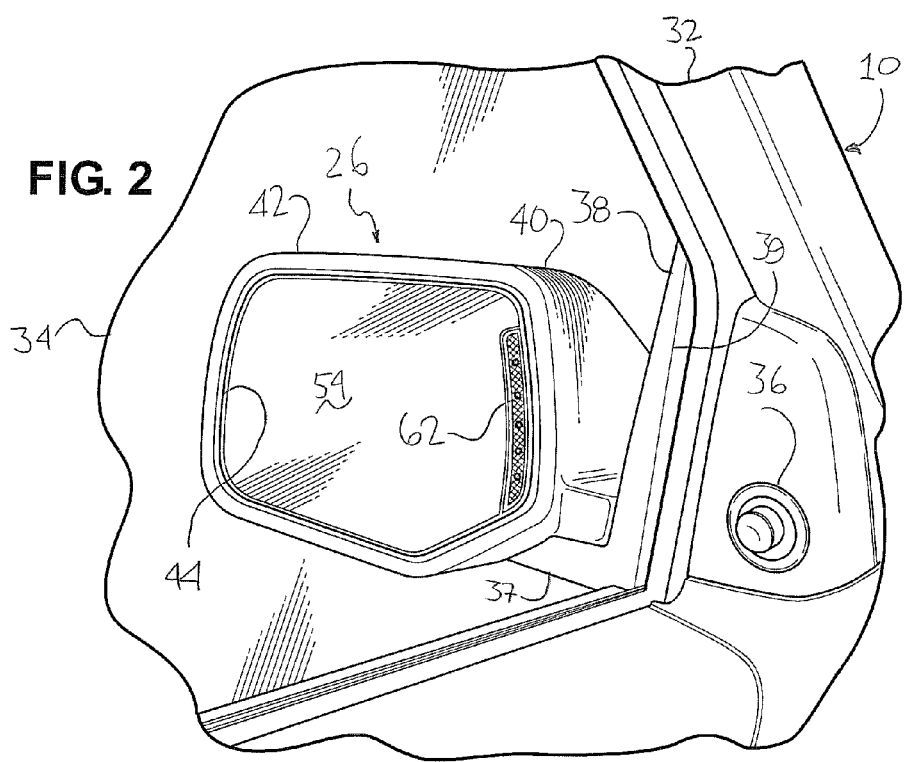
FIG. 2 is a perspective view of one embodiment of the invention secured to a motor vehicle partially cutaway.

Referring to FIG. 2, the side rear view mirror assembly is generally indicated at 26. The perspective of this Figure is from that of the operator 28 as the operator 28 looks into the side rear view mirror assembly 26 to see that which is rearward of the operator 28 and a portion of the motor vehicle 10. FIG. 2 includes a portion of a door 32, a window 34 and a mirror adjustment mechanism, graphically represented by a control knob 36.

The side rear view mirror assembly includes a base 38 that is fixedly secured to the motor vehicle 10 and, more specifically, the door 32 of the motor vehicle 10. The base 38 may or may not include a sail similar to the one shown in FIG. 2. The base 38 is secured to the door 32 through known means. Depending on the design of the base 38, the base 38 may include either a lower rear wall 37 or an upper rear wall 39, or both.

The side rear view mirror assembly 26 also includes a mirror case 40 that is movably secured to the base 38. The mirror case 40 is movable in that it may be pivoted about the base 38 to allow the mirror case 40 to move closer to the side 22 of the motor vehicle 10 when situations require a narrower profile of motor vehicle 10. The pivoting of the mirror case 40 also comes in handy when the motor vehicle moves with respect to a fixed object in close proximity therewith such that the mirror case 40 is pushed in one direction or another due to the relative tightness of the position at which the motor vehicle 10 is operating.

The mirror case 40 defines a housing 42 and a mirror opening 44. The mirror opening 44 faces rearward with respect to forward direction of the motor vehicle 10. The mirror case 40 may include additional openings other than the mirror opening 44 for side markers, turn signals, security lights, and the like. Otherwise, the mirror case 40 includes a housing 42 that is aerodynamic and aesthetically similar to the general design of the motor vehicle 10.

Figure 3:
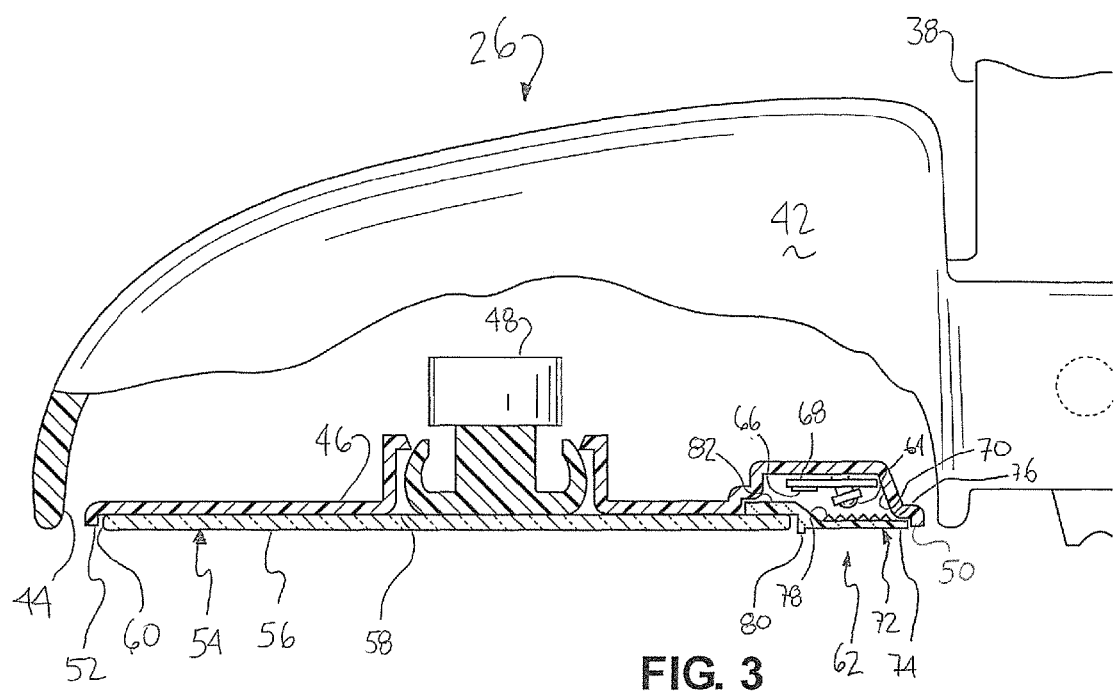
FIG. 3 is a top view, partially cutaway, of a miirror assembly incorporating the invention.

Referring now to FIG. 3, the side rear view mirror assembly 26 is shown with its housing 42 partially cutaway. The side rear view mirror assembly 26 includes a backing plate 46 that is operatively connected to the minor case 40 and faces rearward out through the mirror opening 44. The backing plate 46 is snap fit to a motor mechanism 48 at generally the center of the backing plate 46. While not shown for purposes of simplicity, the motor mechanism 48 is fixedly secured to a structural component of the minor case 40 that extends toward the center of the mirror case 40. The motor mechanism 48 pivots the backing plate 46 in a direction as is controlled by the mirror adjustment mechanism 36 found inside the passenger compartment of the motor vehicle 10. It should be appreciated by those skilled in the art that the motor mechanism 48 may be replaced with a manual linkage that allows the operator 28 to manually adjust the position of the backing plate 46 remotely from the interior of the passenger compartment of the motor vehicle 10. The backing plate 46 is formed out of a thermoset material and is generally unitary in structure. The backing plate 46 defines a backing plate perimeter 50 as is represented by a backing plate rim 52. The majority of the backing plate 46 is planar.

A piece of mirror glass 54 is fixedly secured to the backing plate 46 and is movable therewith in a manner allowing the operator 28 of the motor vehicle 10 to view rearward of the motor vehicle 10. The mirror glass includes a first surface 56 and a second surface 58 that are generally parallel to each other. One of the first surface 56 and the second surface 58 is reflective and the reflective surface is determined by the design parameters of the side rear view mirror assembly 26. It should be appreciated by those skilled in the art that while the first 56 and second 58 surfaces are shown to be flat in this configuration, they may extend through a curved plane in other configurations, such as for use with the side rear view mirror assembly 24 fixedly secured to the passenger side 20 of the motor vehicle 10. The mirror glass 54 is secured to the backing plate 46 using an adhesive or some other mechanism known in the art to secure one to the other. The mirror glass 54 defines a mirror glass perimeter 60 that is not equal to the backing plate perimeter 50.

Disposed between the mirror glass perimeter and the backing plate perimeter 50 is a blind spot indicator, generally indicated at 62. The blind spot indicator 62 is fixedly secured to the backing plate 46 and is in communication with the blind spot sensor 18 to receive signals from the blind spot sensor 18 and to indicate to the operator 28 of the motor vehicle 10 when an object 30 is in the blind spot of the motor vehicle 10. The blind spot indicator 62 is designed to signal the operator when an object is in the blind spot on the driver side of the motor vehicle 10 or when an object is in a blind spot on a passenger side of the motor vehicle. Because the blind spot indicator 62 is fixedly secured to the backing plate 46, the blind spot indicator 62 is adjustable by the operator 28 when the operator 28 moves the backing plate 46 to adjust the mirror glass 54. More specifically, the blind spot indicator 62 is directed toward the operator 28 by the fact that the operator 28 adjusts the mirror glass 54 and the backing plate 46 therefor requiring that the blind spot indicator 62 is directed toward the operator 28. This facilitates a maximum amount of opportunity for the operator 28 to be notified by the blind spot indicator 62 that a blind spot sensor 18 has identified that an object 30 is found in the blind spot of the motor vehicle 10.

The blind spot indicator 62 is disposed adjacent the mirror glass 54. The location of the blind spot 31 indicator 62 removes an additional location in which the operator 28 must divert his or her attention to identify all the issues surrounding the motor vehicle 10 as the operator 28 operates the motor vehicle 10 along the road 12.

The blind spot indicator 62 includes a light source 64 that is illuminated when the blind spot sensor 18 senses the presence of the object 30 in the blind spot of the motor vehicle 10. The light source is electrically connected to a controller 66; both of which are mounted to a circuit board 68. The circuit board 68 is fixedly secured to the backing plate 46. As may be seen in FIG. 3, the backing plate 46 includes a recessed portion 70, within which the circuit board 68, controller 60 and light source 64 are secured.

The blind spot indicator 62 also includes a lens, generally shown at 72. The lens 72 covers the light source 64. The lens 72 includes an exterior surface 74 and an interior surface 76. The interior surface 76 includes a Fresnel lens 78 to further assist the direction of light emitted by the light source 64 by refracting the light toward the operator 28. The exterior surface 74 is planar and parallel to the mirror glass 54. The exterior surface 74 includes an elevated border 80 that extends around the lens 72 along the mirror glass perimeter 60 that it is disposed against.

The lens also includes a positioning flange 82. The positioning flange 82 abuts the second surface 58 of the mirror glass 54 and aligns the lens 72 with the mirror glass 54 such that the lens is directed in the same direction as the minor glass 54. The positioning flange 82 also is secured to the second surface 58 to maintain the lens 72 in the proper position.

Figure 4:
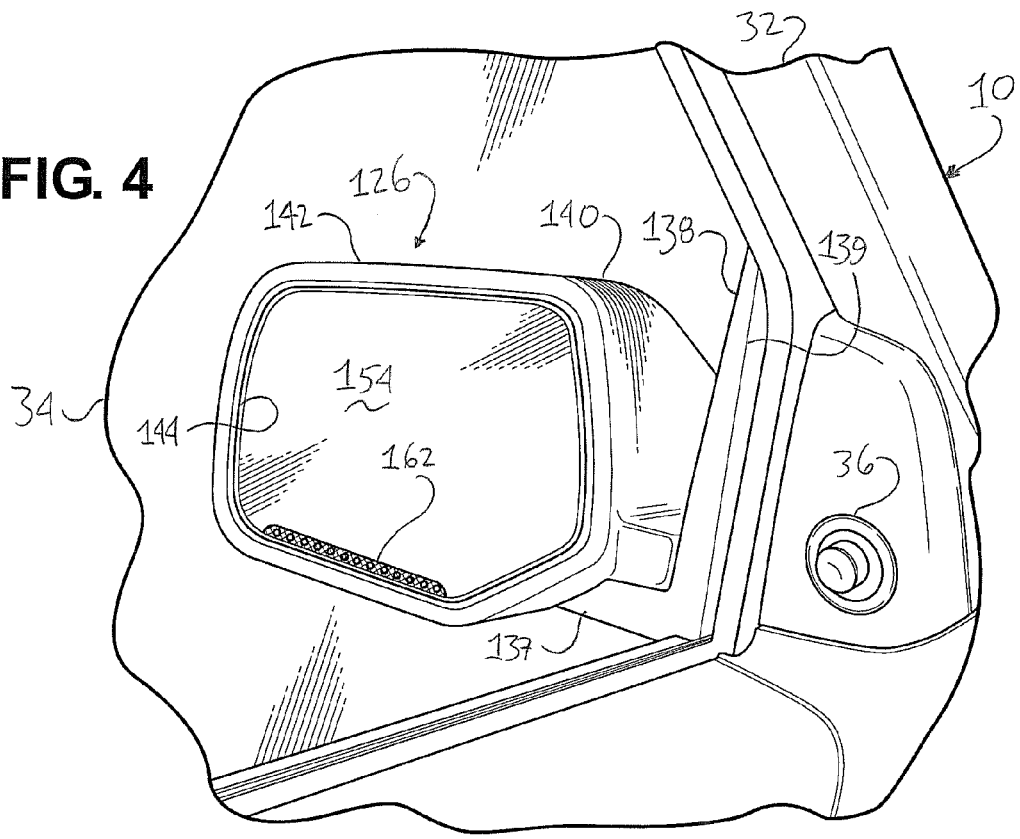
FIG. 4 is a perspective view of a second embodiment of the invention.
Figure 5:
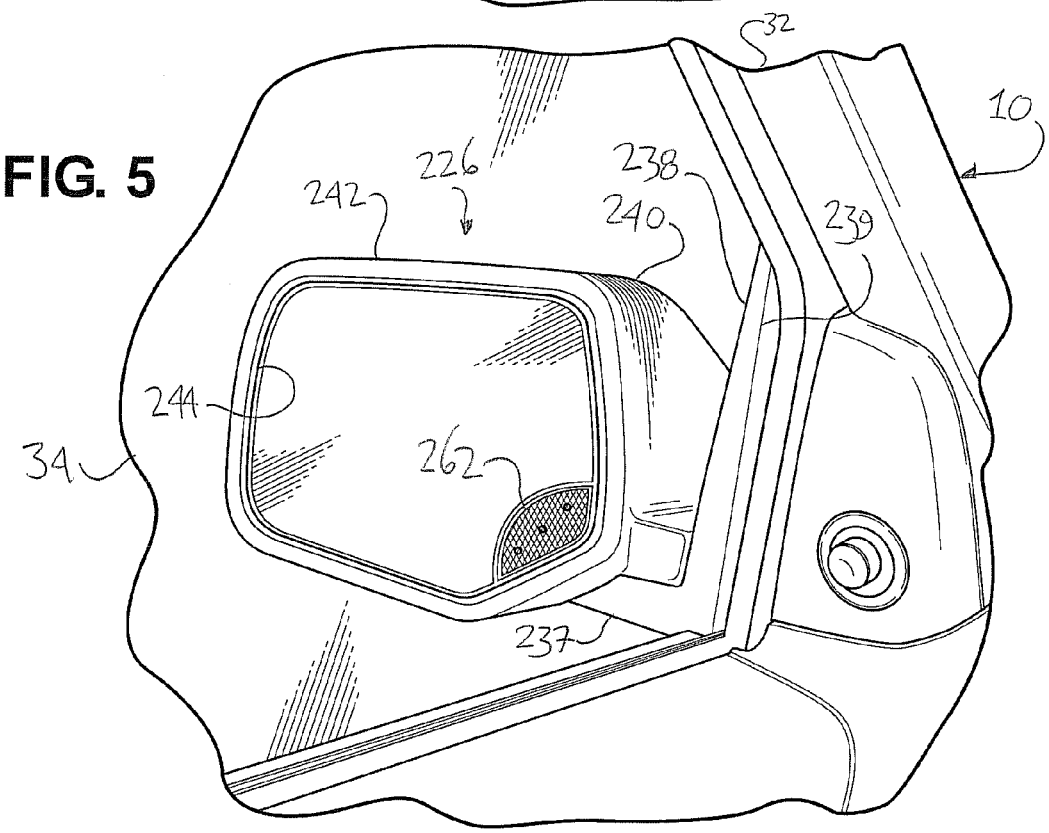
FIG. 5 is a perspective view of a third embodiment of the invention.

Referring to FIGS. 3 and 4, wherein reference characters offset by hundreds represent similar elements, there are two additional configurations for the blind spot indicator 62. These blind spot indicators 162, 262 illustrate the blind spot indicator 162, 262 in various locations with respect to the mirror glass 154, 254.

Figure 6:
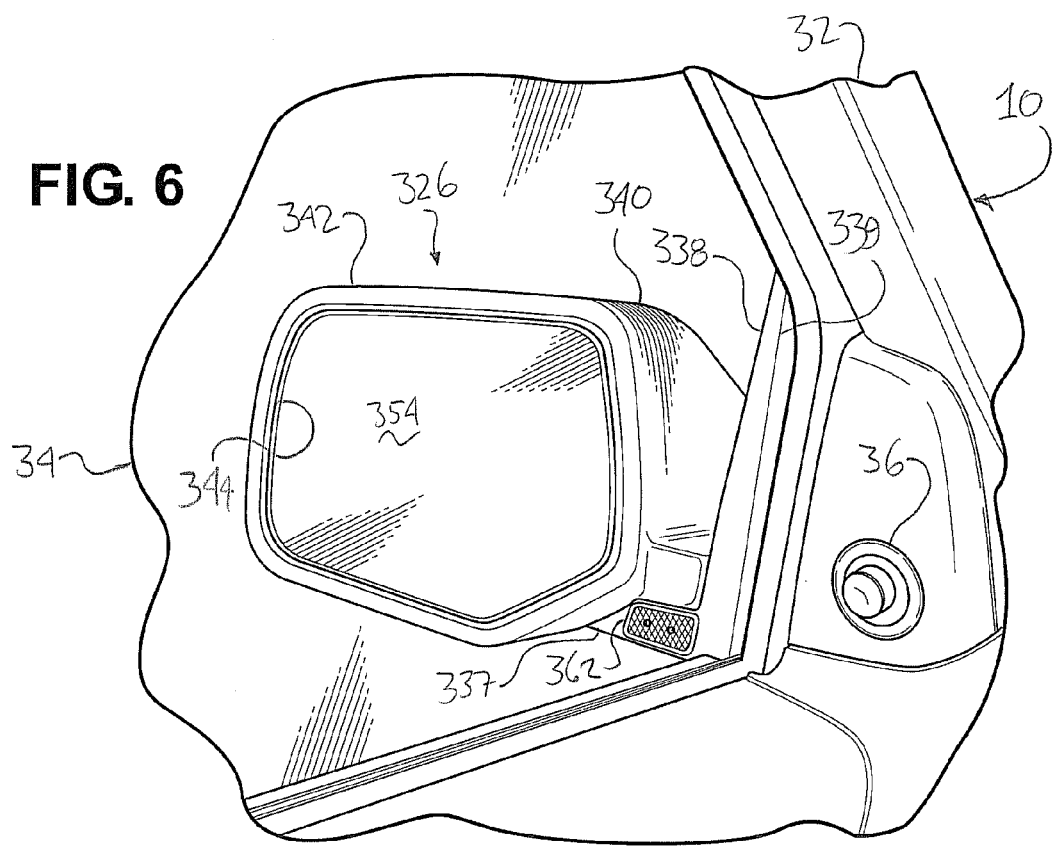
FIG. 6 is a perspective view of a fourth embodiment of the invention.
Figure 7:
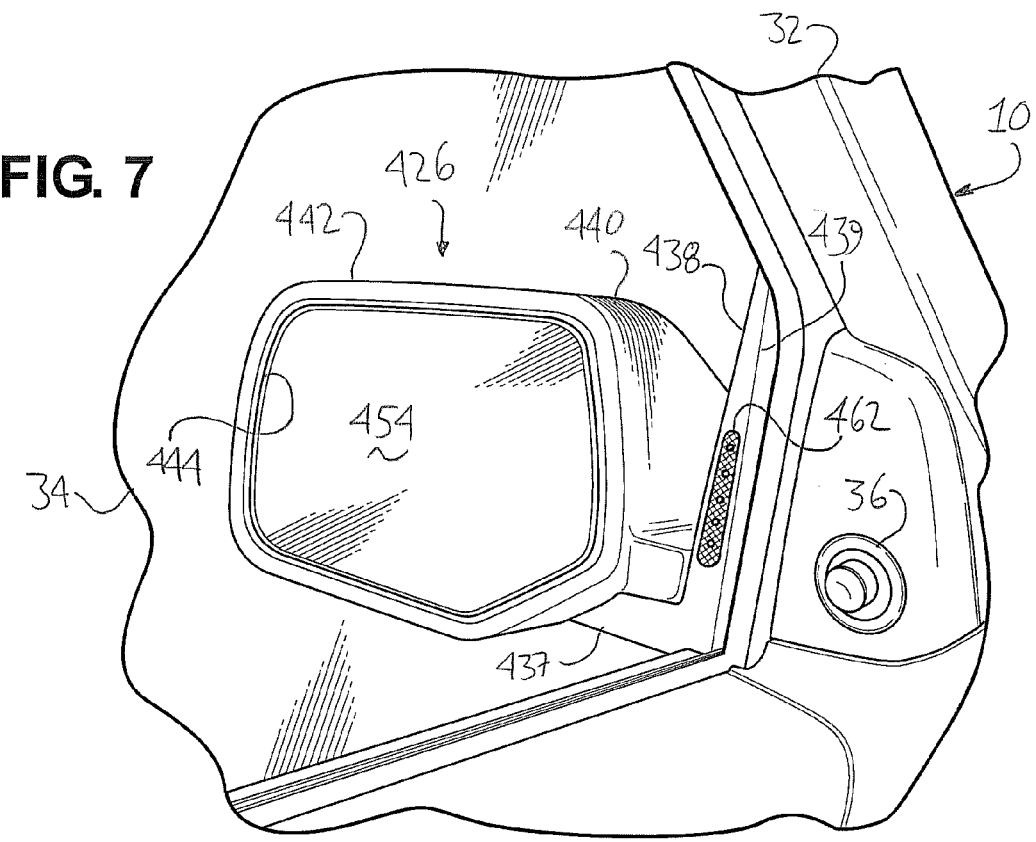
FIG. 7 is a perspective view of a fifth embodiment of the invention.

With regard to FIGS. 6 and 7, the blind spot indicator 362, 462 are not located on the backing plate 46. In these embodiments, the blind spot indicators 362, 462 are located within the lower rear wall 337 and the upper rear wall 439 of the base 338, 438, respectively. The blind spot indicators 362, 462 are angled toward the operator and are completely visible to the operator 28. The structures of the blind spot indicators 362, 462 are similar to those in the embodiments discussed above.

Figure 8:
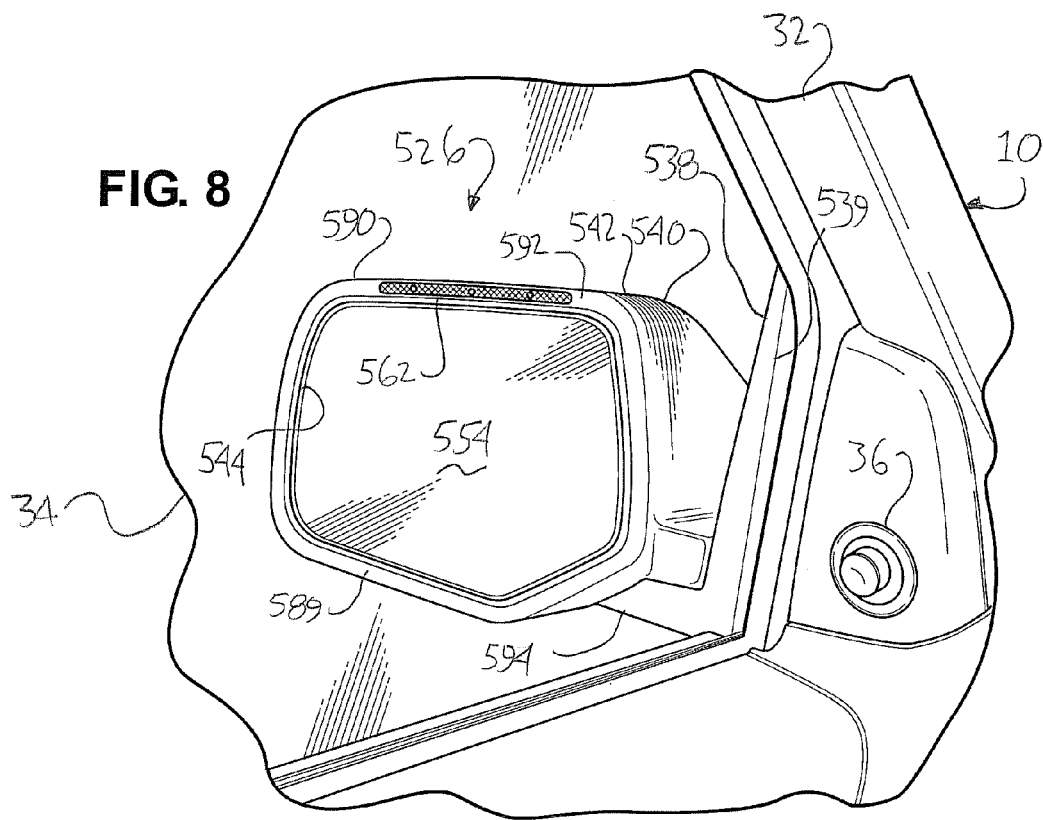
FIG. 8 is a perspective view of a sixth mirror assembly.
Figure 9:
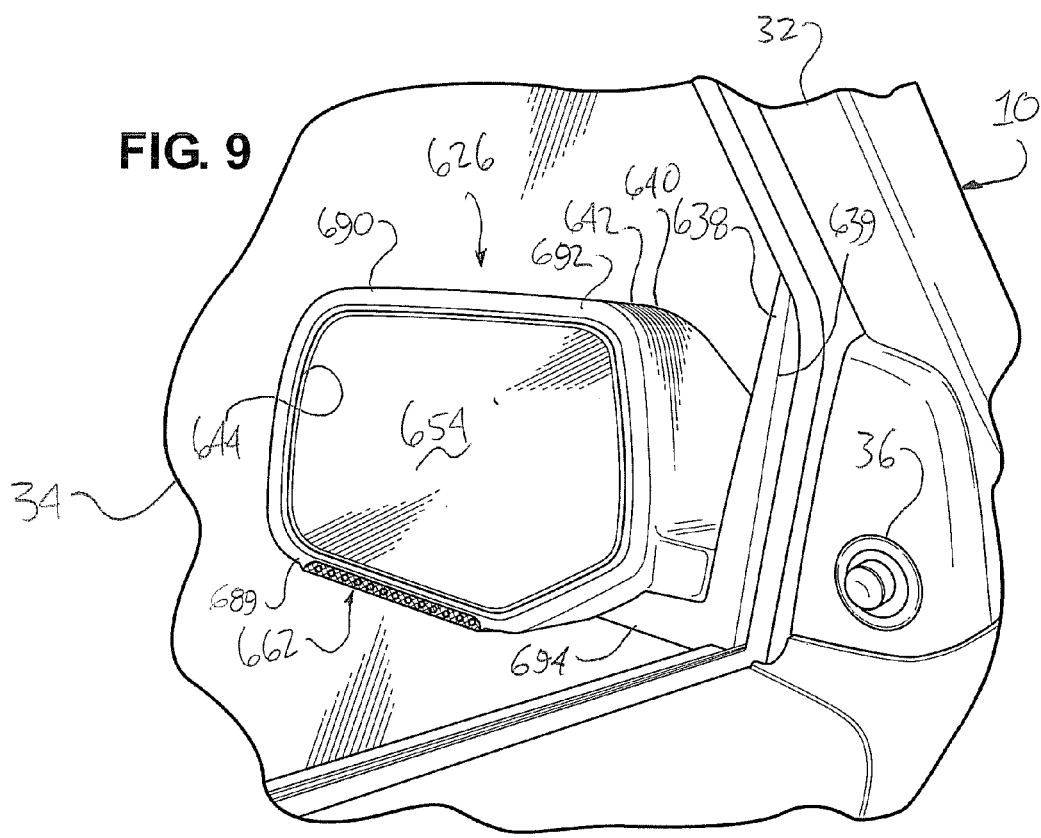
FIG. 9 is a perspective view of a seventh embodiment of the invention.

With reference to FIGS. 8 and 9, the blind spot indicator 562, 662 is located in a position along an edge of the housing 542, 642 immediately adjacent the mirror opening 544, 644. These mirror openings 544, 644 are framed by case frames 590, 690. The case frames 590, 690 create an angle toward the operator 28. The case frames 590, 690 define an upper edge 592, 692 and a lower edge 594, 694, respectively. Light emanating from the blind spot indicators 562, 662 is directed toward the operator 28 to maximize the likelihood of getting the attention of the operator that an object is occupying the blind spot 31. The structures of the blind spot indicators 562, 662 are similar to those in the embodiments discussed above.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

We claim:

1. A side rear view mirror assembly for a motor vehicle equipped with a blind spot sensor designed to detect objects in blind spots of the motor vehicle, said side rear view mirror assembly comprising:
   a base fixedly secured to the motor vehicle;
   a mirror case movably secured to said base, said mirror case defining a housing and a mirror opening facing rearward;
   a backing plate operatively connected to said mirror case facing rearward, said backing plate defining a backing plate perimeter and movable with respect to said mirror case;
   a mirror glass fixedly secured to said backing plate and movable therewith in a manner allowing an operator of the motor vehicle to view rearward of the motor vehicle, said mirror glass defining a mirror glass perimeter; and
   a blind spot indicator fixedly secured to said backing plate disposed adjacent said mirror glass between said mirror glass perimeter and said blacking plate perimeter and in communication with the blind spot sensor to receive signals from the blind spot sensor and to indicate to the operator of the motor vehicle when an object is in the blind spot of the motor vehicle, wherein an orientation of said blind spot indicator is adjustable by the operator when the operator moves said backing plate to adjust said mirror glass.

2. A side rear view mirror assembly as set forth in claim 1 wherein said blind spot indicator includes a light source to be illuminated when the blind spot sensor senses the presence of an object in the blind spot of the motor vehicle.

3. A side rear view mirror assembly as set forth in claim 2 wherein said blind spot indicator includes a lens covering said light source.

4. A side rear view mirror assembly as set forth in claim 3 wherein said lens includes an exterior surface and an interior surface.

5. A side rear view mirror assembly as set forth in claim 4 wherein said interior surface includes Fresnel lenses to refract light emitted by said light source to optimize the amount of light directed toward the operator of the motor vehicle.

6. A side rear view mirror assembly as set forth in claim 5 wherein said exterior surface is planar.

7. A side rear view mirror assembly as set forth in claim 6 wherein said exterior surface is parallel with said mirror glass.

8. A side rear view mirror assembly as set forth in claim 7 wherein said exterior surface includes an elevated border extending around a perimeter of said lens.

9. A side rear view minor assembly as set forth in claim 8 wherein said lens includes a positioning flange wherein said positioning flange abuts said mirror glass to align said lens with said mirror glass.

* * * * *